United States Patent
Liu et al.

(10) Patent No.: US 11,348,309 B2
(45) Date of Patent: May 31, 2022

(54) AUGMENTED REALITY-BASED COLORING METHOD AND APPARATUS, ELECTRONIC DEVICE AND STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Xiangjun Liu, Beijing (CN); Chao Yang, Beijing (CN); Kunpeng Qi, Beijing (CN); Guoping Gao, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 17/339,681

(22) Filed: Jun. 4, 2021

(65) Prior Publication Data
US 2021/0312705 A1    Oct. 7, 2021

Related U.S. Application Data

(63) Continuation of application No. PCT/CN2019/100977, filed on Aug. 16, 2019.

(30) Foreign Application Priority Data

Dec. 7, 2018   (CN) .......................... 201811497751.3

(51) Int. Cl.
*G06T 17/20*   (2006.01)
*G06T 15/80*   (2011.01)
(Continued)

(52) U.S. Cl.
CPC .............. *G06T 15/80* (2013.01); *G06T 15/04* (2013.01); *G06T 17/205* (2013.01);
(Continued)

(58) Field of Classification Search
None
See application file for complete search history.

(56) References Cited

U.S. PATENT DOCUMENTS

| 2013/0100132 A1 | 4/2013 | Katayama et al. |
| 2016/0049001 A1* | 2/2016 | Anderson ............... G06T 17/05 345/419 |
| 2018/0158230 A1* | 6/2018 | Yan ..................... G06K 9/00208 |

FOREIGN PATENT DOCUMENTS

| CN | 108664884 A | 10/2018 |
| CN | 108805090 A | 11/2018 |

(Continued)

OTHER PUBLICATIONS

Extended European Search Report for related Application No. 19893797.1, dated Dec. 16, 2021.
(Continued)

*Primary Examiner* — Robert J Craddock (57) ABSTRACT

Disclosed are an augmented reality-based coloring method and apparatus, an electronic device and a storage medium. The method comprises: acquiring three-dimensional mesh information of a human face, and acquiring position coordinates and texture coordinates of respective vertices of a target portion of the human face based on the three-dimensional mesh information of the human face; constructing a three-dimensional mesh of the target portion according to the position coordinates of respective vertices of the target portion, and determining a normal line of each vertex in the three-dimensional mesh; and coloring the target portion based on the position coordinates, the texture coordinates and a normal line of each vertex in the three-dimensional
(Continued)

mesh, a preset shading map of the target portion, and a target RGB value of the target portion, thereby improving the stereoscopic impression and the sense of reality of coloring, and improving the user experience.

20 Claims, 5 Drawing Sheets

(51) Int. Cl.
    *G06T 15/04*     (2011.01)
    *G06T 19/00*     (2011.01)
    *G06T 19/20*     (2011.01)

(52) U.S. Cl.
    CPC ............ *G06T 19/006* (2013.01); *G06T 19/20* (2013.01); *G06T 2219/2012* (2013.01)

(56) References Cited

FOREIGN PATENT DOCUMENTS

| | | |
|---|---|---|
| CN | 108898068 A | 11/2018 |
| JP | 2012113747 A | 6/2012 |
| WO | WO2017149315 A1 | 9/2017 |

OTHER PUBLICATIONS

M. Zollhofer et al., "State of the Art on Monocular 3D Face Reconstruction, Tracking, and Applications", Computer Graphics Forum: Journal of the European Association for Computer Graphics, vol. 37, No. 2, May 1, 2018.

* cited by examiner

AUGMENTED REALITY-BASED COLORING METHOD AND APPARATUS, ELECTRONIC DEVICE AND STORAGE MEDIUM

CROSS-REFERENCE TO RELATED APPLICATIONS

This application is a continuation of International Application No. PCT/CN2019/100977, filed on Aug. 16, 2019, which claims priority to Chinese patent application No. 201811497751.3 titled "AUGMENTED REALITY-BASED COLORING METHOD AND APPARATUS, ELECTRONIC DEVICE AND STORAGE MEDIUM" filed with the Chinese Patent Office on Dec. 7, 2018. The contents of both of the above applications are incorporated herein by reference in their entireties.

TECHNICAL FIELD

Embodiments of the present application relate to the field of image processing technology, and in particular, to an augmented reality-based coloring method and apparatus, an electronic device, and a storage medium.

BACKGROUND

With the rapid development of augmented reality (AR) technology and the popularity of online shopping, AR makeup try-on has developed rapidly. For example, when users buy lip gloss, they do not need to go to a store counter to try a color, but can try makeup using AR to purchase their favorite lip gloss online, improving the shopping convenience for users. At the same time, when trying on AR makeup, it is not needed to apply cosmetics one by one like in a counter, and this is highly clean.

An existing AR makeup try-on method is to collect a user's face image and perform feature detection based on the face image. Then, a feature point tracking technology is used for real-time tracking, and on the basis of the feature points, the feature points of a mouth are found, and a corresponding lip mesh model is drawn and colored.

However, based on the existing method, planar coordinates of the feature points of a human face are obtained, and then the lip mesh is planar, lacking stereoscopic impression and causing distortion of lighting effect on lips.

SUMMARY

Embodiments of the present application provide an augmented reality-based coloring method and apparatus, an electronic device, and a storage medium.

According to a first aspect, embodiments of the present application provide an augmented reality-based coloring method, including:

acquiring three-dimensional mesh information of a human face, and acquiring position coordinates and texture coordinates of respective vertices of a target portion of the human face based on the three-dimensional mesh information of the human face;

constructing a three-dimensional mesh of the target portion according to the position coordinates of each vertex of the target portion, and determining a normal line of each vertex in the three-dimensional mesh; and coloring the target portion based on the position coordinates, the texture coordinates and the normal line of each vertex in the three-dimensional mesh, a preset shading map of the target portion, and a target red-green-blue (RGB) value of the target portion.

In a possible implementation of the first aspect, the coloring the target portion based on the position coordinates, the texture coordinates and the normal line of each vertex in the three-dimensional mesh, a preset shading map of the target portion, and a target RGB value of the target portion, includes:

rasterizing a triangle face where each vertex is located according to the position coordinates, the texture coordinates and the normal line of each vertex in the three-dimensional mesh, and determining position coordinates, texture coordinates, and a normal line of each of pixels on each triangle face;

acquiring a gray value corresponding to each of the pixels from the shading map according to the position coordinates and the texture coordinates of each of the pixels; and coloring each of the pixels according to the gray value and the normal line of each of the pixels and the target RGB value.

In another possible implementation of the first aspect, the coloring each of the pixels according to the gray value and the normal line of each of the pixels and the target RGB value, includes:

determining a diffuse reflection color value of each of the pixels according to the normal line of each of the pixels, a diffuse reflection intensity, a direction of light and the target RGB value;

determining a highlight color of each of the pixels according to the normal line and the gray value of each of the pixels, a preset highlight intensity, the direction of light, a line-of-sight direction, and a smoothness coefficient; and determining a color value of each of the pixels output to a display according to the diffuse reflection color value and the highlight color of each of the pixels.

In another possible implementation of the first aspect, the determining a color value of each of the pixels output to a display according to the diffuse reflection color value and the highlight color of each of the pixels, includes:

for each of the pixels, taking a sum of the diffuse reflection color value and the highlight color of the pixel as the color value of the pixel output to the display.

In another possible implementation of the first aspect, the determining a normal line of each vertex in the three-dimensional mesh, includes:

for each vertex in the three-dimensional mesh, acquiring all triangles including the vertex;

determining a normal line of the vertex on each of the triangles; and determining the normal line of the vertex according to the normal line of the vertex on each of the triangles.

In another possible implementation of the first aspect, the determining a normal line of the vertex according to the normal line of the vertex on each of the triangles, includes:

adding the normal line of the vertex on each of the triangles and performing normalization processing to obtain the normal line of the vertex.

In another possible implementation of the first aspect, the determining a normal line of the vertex on each of the triangles, includes:

cross-multiplying vectors of two sides of the triangle where the vertex is located to determine the normal line of the vertex on each of the triangles.

In another possible implementation of the first aspect, the target portion is a lip, and the target RGB value is an RGB value of a target lip gloss.

According to a second aspect, embodiments the present application provides an augmented reality-based coloring apparatus, including:

an acquiring module, configured to acquire three-dimensional mesh information of a human face, and acquire position coordinates and texture coordinates of respective vertices of a target portion of the human face based on the three-dimensional mesh information of the human face;

a constructing module, configured to construct a three-dimensional mesh of the target portion according to the position coordinates of respective vertices of the target portion;

a normal line determining module, configured to determine a normal line of each vertex in the three-dimensional mesh;

a coloring module, configured to color the target portion based on the position coordinates, the texture coordinates and the normal line of each vertex in the three-dimensional mesh, a preset shading map of the target portion, and a target RGB value of the target portion.

In a possible implementation of the second aspect, the coloring module comprises: a determining unit, configured to rasterize a triangle face where each vertex is located according to the position coordinates, the texture coordinates and the normal line of each vertex in the three-dimensional mesh, and determine position coordinates, texture coordinates, and a normal line of each of pixels on each triangle face;

an acquiring unit, configured to acquire a gray value corresponding to each of the pixels from the shading map according to the position coordinates and the texture coordinates of each of the pixels; and a coloring unit, configured to color each of the pixels according to the gray value and the normal line of each of the pixels and the target RGB value.

In another possible implementation of the second aspect, the coloring unit is specifically configured to determine a diffuse reflection color value of each of the pixels according to the normal line of each of the pixels, a diffuse reflection intensity, a direction of light and the target RGB value; determine a highlight color of each of the pixels according to the normal line and the gray value of each of the pixels, and a preset highlight intensity, a direction of light, a line-of-sight direction, and a smoothness coefficient; and determine a color value of each of the pixels output to a display according to the diffuse reflection color value and the highlight color of each of the pixels.

In another possible implementation of the second aspect, the coloring unit is specifically configured to, for each of the pixels, take a sum of the diffuse reflection color value and the highlight color of the pixel as the color value of the pixel output to the display.

In another possible implementation of the second aspect, the normal line determining module is specifically configured to, for each vertex in the three-dimensional mesh, acquire all triangles including the vertex; determine a normal line of the vertex on each of the triangles; and determine the normal line of the vertex according to the normal line of the vertex on each of the triangles.

In another possible implementation of the second aspect, the normal line determining module is specifically configured to add the normal line of the vertex on each of the triangles and perform normalization processing to obtain the normal line of the vertex.

In another possible implementation of the second aspect, the normal line determining module is specifically configured to cross-multiply vectors of two sides of the triangle where the vertex is located to determine the normal line of the vertex on each of the triangles.

In another possible implementation of the second aspect, the target portion is a lip, and the target RGB value is an RGB value of a target lip gloss.

According to a third aspect, an embodiment of the present application provides an electronic device, including:

a memory, configured to store a computer program; and a processor, configured to execute the computer program to implement the augmented reality-based coloring method according to the first aspect.

According to a fourth aspect, an embodiment of the present application provides an electronic device, including:

a camera, configured to collect a human face image of a user;

a processor, configured to acquire three-dimensional mesh information of a human face according to the human face image, and acquire position coordinates and texture coordinates of respective vertices of a target portion of the human face based on the three-dimensional mesh information of the human face; construct a three-dimensional mesh of the target portion according to the position coordinates of each vertex of the target portion, and determine a normal line of each vertex in the three-dimensional mesh; and color the target portion based on the position coordinates, the texture coordinates and the normal line of each vertex in the three-dimensional mesh, a preset shading map of the target portion, and a target RGB value of the target portion.

According to a fifth aspect, an embodiment of the present application provides an electronic device, including:

a central processing unit, configured to acquire three-dimensional mesh information of a human face, and acquire position coordinates and texture coordinates of each vertex of a target portion of the human face based on the three-dimensional mesh information of the human face; construct a three-dimensional mesh of the target portion according to the position coordinates of each vertex of the target portion, and determine a normal line of each vertex in the three-dimensional mesh; and an image processor, configured to color the target portion based on the position coordinates, the texture coordinates and the normal line of each vertex in the three-dimensional mesh, a preset shading map of the target portion, and a target RGB value of the target portion.

In a possible implementation of the fifth aspect, the image processor is specifically configured to rasterize a triangle face where each vertex is located according to the position coordinates, the texture coordinates and the normal line of each vertex in the three-dimensional mesh, and determine position coordinates, texture coordinates, and a normal line of each of pixels on each triangle face; acquire a gray value corresponding to each of the pixels from the shading map according to the position coordinates and the texture coordinates of each of the pixels; and color each of the pixels according to the gray value and the normal line of each of the pixels and the target RGB value.

In another possible implementation of the fifth aspect, the image processor is specifically configured to determine a diffuse reflection color value of each of the pixels according to the normal line of each of the pixels, a diffuse reflection intensity, a direction of light and the target RGB value; determine a highlight color of each of the pixels according to the normal line and the gray value of each of the pixels, a preset highlight intensity, the direction of light, a line-of-sight direction, and a smoothness coefficient; and determine a color value of each of the pixels output to a display according to the diffuse reflection color value and the highlight color of each of the pixels.

In another possible implementation of the fifth aspect, the image processor is specifically configured to, for each of the pixels, take a sum of the diffuse reflection color value and the highlight color of the pixel as the color value of the pixel output to the display.

In another possible implementation of the fifth aspect, the central processing unit is specifically configured to, for each vertex in the three-dimensional mesh, acquire all triangles including the vertex; determine a normal line of the vertex on each of the triangles; and determine a normal line of the vertex according to the normal line of the vertex on each of the triangles.

In another possible implementation of the fifth aspect, the central processing unit is specifically configured to add the normal line of the vertex on each of the triangles and perform normalization processing to obtain the normal line of the vertex.

In another possible implementation of the fifth aspect, the central processing unit is specifically configured to cross-multiply vectors of two sides of the vertex in the triangle to determine the normal line of the vertex on each of the triangles.

In another possible implementation of the fifth aspect, the target portion is a lip, and the target RGB value is the RGB value of the target lip gloss.

According to a sixth aspect, an embodiment of the present application provides a computer storage medium, having a computer program stored thereon, where the computer program is configured to implement the augmented reality-based coloring method according to any item of the first aspect.

The augmented reality-based coloring method and apparatus, the electronic device and the storage medium provided by embodiments of the present application acquire three-dimensional mesh information of a human face, and acquire position coordinates and texture coordinates of respective vertexes of a target portion of the human face based on the three-dimensional mesh information of the human face; construct a three-dimensional mesh of the target portion according to the position coordinates of respective vertexes of the target portion, and determine a normal line of each vertex in the three-dimensional mesh; and color the target portion based on the position coordinates, the texture coordinates and the normal line of each vertex in the three-dimensional mesh, a preset shading map of the target portion, and a target RGB value of the target portion, thereby improving the stereoscopic impression and the sense of reality of coloring, and improving the user experience.

BRIEF DESCRIPTION OF DRAWINGS

In order to describe the technical solutions in the embodiments of the present application or the prior art more clearly, the accompanying drawings which need to be used in the description of the embodiments or the prior art will be briefly introduced below. Obviously, the accompanying drawings in the following description are some embodiments of the present application, and for those of ordinary skill in the art, other drawings can be obtained based on these accompanying drawings without paying creative efforts.

DESCRIPTION OF EMBODIMENTS

Embodiments of the present application are described clearly and completely below with reference to the accompanying drawings, to make the object, technical solution and advantages of the embodiments of the present application more clearly. Obviously, the embodiments described are part of embodiments of the present application, rather than all of the embodiments. All other embodiments obtained by those of ordinary skill in the art, based on the embodiments in this application without creative work shall fall within the protection scope of the present application.

Augmented reality (AR) technology is a technology that calculates the position and posture of a camera in real time, and superimposes images, videos, and three-dimensional rendering models in a real-world scene. This technology was first proposed in the 1920s, and was limited by the computing power of devices and not widely popularized within a period of time after it was proposed. However, with the improvement of the computing power of electronic products, the application of augmented reality becomes more and more widespread. Mobile devices (mobile phones, tablet computers, etc.) have become popular and the cost has been greatly reduced, so integrating augmented reality applications in mobile devices has become a hot spot recently. In July 2016, Nintendo, Pokémon, and Niantic jointly released the world's first augmented reality game Pokémon GO, which became popular all over the world and won the Oscar award in the game The Game Awards (Game of the Year Award) in 2016. It can be seen behind the game that augmented reality technology has entered into people's daily life. In addition to being used in games, augmented reality can also be used in people's daily life. For example, in applications for e-commerce home decoration, users can place virtual furniture in their rooms to select and determine their favorite furniture products that best match the existing rooms; or in advertising marketing scenarios, users can scan a certain manufacturer's logo to watch a certain promotion animation, participate in a certain discount activity, and get coupons.

The augmented reality-based coloring method provided by the embodiments of the present application is applicable to the fields of augmented reality, computer vision, and computer graphics. It may be used for makeup try-on in online shopping, and may also be applied to other coloring.

The technical solution of the present application will be described in detail below with specific embodiments. The following specific embodiments may be combined with each other, and the same or similar concepts or processes may not be repeated in some embodiments.

Figure 1:
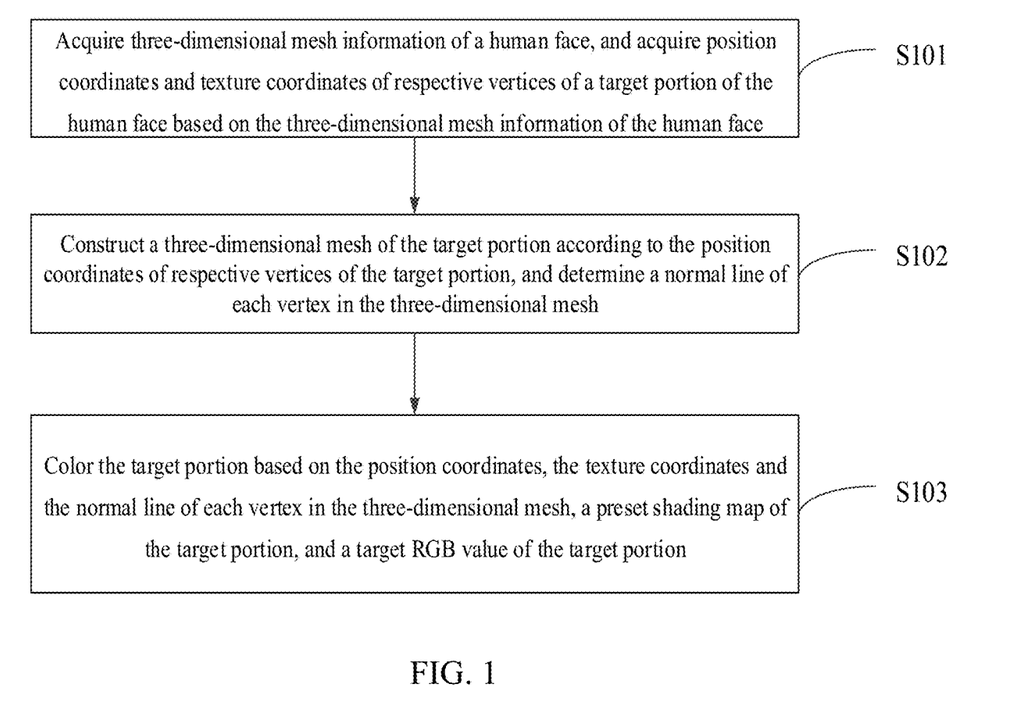
FIG. 1 is a schematic flowchart of an augmented reality-based coloring method provided in a first embodiment of the present application.

FIG. 1 is a schematic flowchart of an augmented reality-based coloring method provided in a first embodiment of the present application, and the method of this embodiment includes:

S101: acquire three-dimensional mesh information of a human face, and acquire position coordinates and texture coordinates of respective vertexes of a target portion of the human face based on the three-dimensional mesh information of the human face.

An executive entity of the embodiment of the present application may be an apparatus with a coloring function, such as an augmented reality-based coloring apparatus, hereinafter referred to as a coloring apparatus.

The coloring apparatus may be a separate electronic device, or a part of an electronic device, for example, a central processing unit (CPU) or a graphics processing unit (GPU) in the electronic device.

Optionally, the coloring apparatus in the embodiment of the present application includes a CPU and a GPU. That is, part of the steps in this embodiment is completed by the CPU, and the other steps are completed by the GPU. For example, the steps from S101 to S102 are completed by the CPU, and the step of S103 is completed by the GPU.

The embodiments of the present application do not limit the specific executive entity of the foregoing method, which is specifically determined according to actual needs.

The target portion in this embodiment is any part of the human face, such as lips, eyes, eyebrows, cheeks and other facial parts.

In this embodiment, any of the above-mentioned target portions may be colored, which improves the stereoscopic impression and the sense of reality of coloring.

The three-dimensional mesh information of the human face in the embodiment of the present application is generated based on a human face image collected by a depth camera.

In addition to obtaining a planar image, the depth camera can also obtain depth information of the photographed object, that is, three-dimensional position and size information, so that the entire computing system obtains three-dimensional data of the environment and the object. According to technical classification, depth cameras can be divided into the following three types of mainstream technology: structured light, binocular vision, and time of flight (TOF).

Structured light is currently a mainstream and most widely used depth perception solution. Its basic principle is that a structured light projector projects a controllable light spot, light strip or light plane structure on the surface of the object to be measured, an image is obtained by the image sensor and three-dimensional coordinates of the object are obtained through the geometric relationship of the system by calculation using the triangulation principle.

The human face image collected by the aforementioned depth camera is processed to generate three-dimensional mesh information of the human face.

For example, the vertices, texture coordinates, and triangular face data of the human face mesh are extracted from the video stream collected by the depth camera, through the AR Face Anchor object of the AR Kit, to generate the three-dimensional mesh information of the human face.

Since the number of vertices and the relative positions of the feature points in the mesh information of a human face are fixed, sequence numbers of the feature points of the target portion (such as lips) can be found, and then the vertex information of the target portion is further obtained, where the vertex information includes vertex coordinates and texture coordinates.

S102: construct a three-dimensional mesh of the target portion according to the position coordinates of respective vertices of the target portion, and determine a normal line of each vertex in the three-dimensional mesh.

On basis of the above steps, after obtaining the vertex coordinates of the target portion, a three-dimensional mesh of the target portion is constructed based on the vertex coordinates of the target portion.

Figure 2:
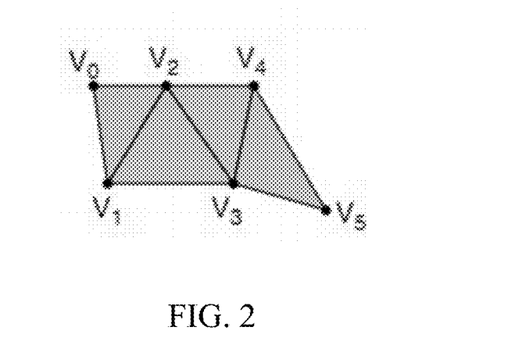
FIG. 2 is a schematic diagram of a three-dimensional mesh involved in an embodiment of the present application.

For example, as shown in FIG. 2, a three-dimensional mesh of the target portion is generated according to a GL TRIANGLE STRIP method using opengles as a rendering api. That is, three adjacent vertices are connected to generate a three-dimensional mesh of the target portion as shown in FIG. 2.

Optionally, other existing methods may also be used to construct a three-dimensional mesh of the target portion based on the vertex coordinates of the target portion, which is not limited in this embodiment.

The normal line is necessary data for illumination calculation. Since normal lines are missing in the three-dimensional mesh of the target portion generated above, it is necessary to re-determine the normal lines based on the vertex coordinates.

This embodiment needs to determine the normal line of each vertex in the three-dimensional network, and a process for determining the normal line for each vertex is the same.

Therefore, the embodiment takes the process for determining the normal line of a vertex (for example, vertex v0) as an example for explanation, to which reference may be made for other vertices.

Figure 3:
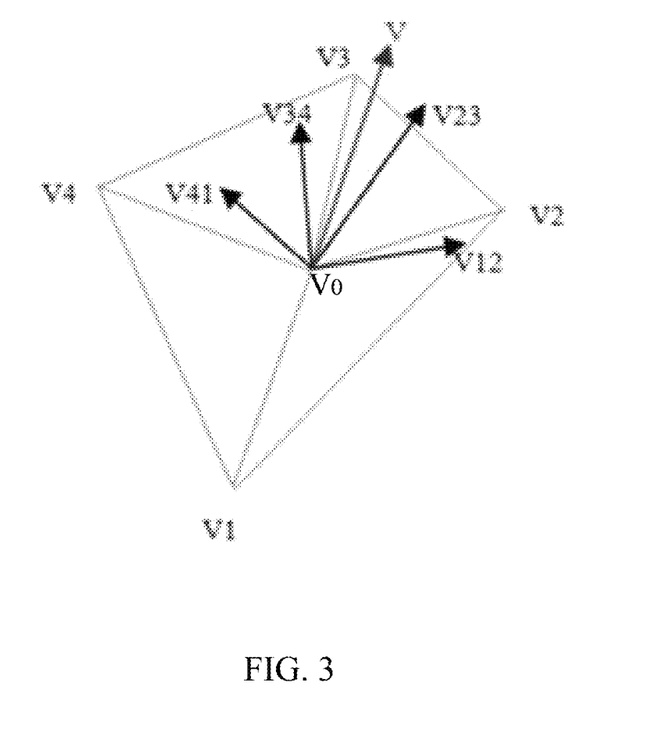
FIG. 3 is a schematic diagram of normal lines involved in an embodiment of the present application.

Respective triangles where the vertex v0 is located are obtained. As shown in FIG. 3, the triangles where v0 is located include: $\Delta v0v1v2$, $\Delta v0v2v3$, $\Delta v0v3v4$, and $\Delta v0v4v1$. The normal line of the vertex v0 is determined according to the coordinates of the vertex v0 as well as $\Delta v0v1v2$, $\Delta v0v2v3$, $\Delta v0v3v4$ and $\Delta v0v4v1$.

In an example, if $\Delta v0v1v2$, $\Delta v0v2v3$, $\Delta v0v3v4$ and $\Delta v0v4v1$ are on a plane, the normal line of any one of the above-mentioned triangles may be used as the normal line of the vertex v0, for example, the normal line of $\Delta v0v4v1$ may be used as the normal line of the vertex v0.

In another example, the normal line of each of the triangles $\Delta v0v1v2$, $\Delta v0v2v3$, $\Delta v0v3v4$, and $\Delta v0v4v1$ is obtained, and the normal lines of respective triangles are added and an average value is taken as the normal line of the vertex v0.

In another example, the normal line of the vertex on each triangle is determined, and the normal line of the vertex is determined according to the normal line of the vertex on each triangle.

That is, the normal line of vertex v0 on $\Delta v0v1v2$ is determined, denoted as $\overline{v0v12}$, the normal line of vertex v0 on $\Delta v0v2v3$ is determined, denoted as $\overline{v0v23}$, the normal line of vertex v0 on $\Delta v0v3v4$ is determined, denoted as $\overline{v0v34}$, and the normal line of vertex v0 on $\Delta v0v4v1$ is determined, denoted as $\overline{v0v41}$.

Next, the normal line of the vertex is determined through the normal line of the vertex on each triangle.

Optionally, the average value of the normal lines of the vertex v0 on respective triangles may be used as the normal line of the vertex v0, and the average value may be an arithmetic average value or a weighted average value.

Optionally, the normal lines of the vertex v0 on respective triangles are added and normalized to obtain the normal line $\overline{v0v}$ of the vertex.

Optionally, determining the normal lines of the vertex on each triangle may include:

cross-multiplying vectors of two sides of the triangle where the vertex is located to determine the normal line of the vertex on each of the triangles.

For example, $\overline{v0v41}=v04 \times v01$.

S103. color the target portion based on the position coordinates, the texture coordinates and the normal line of each vertex in the three-dimensional mesh, a preset shading map of the target portion, and a target RGB value of the target portion.

It should be noted that when the three-dimensional mesh of the target portion is constructed by the vertex coordinates of the target portion mentioned above, since the vertices of the target portion used include vertex coordinates and texture coordinates, the information of each vertex of the generated three-dimensional mesh includes vertex coordinates and texture coordinates.

The shading map is a grayscale image matching a lip model, in which the values of the three RGB channels are the same.

In this embodiment, the preset shading map of the target portion may be stored in advance, for example, stored in the coloring apparatus by a design personnel in advance. For example, when the coloring apparatus includes a GPU, the shading map may be loaded in the GPU's video memory.

Optionally, the coloring apparatus may further include a shading map of another portion of the human face. The coloring apparatus may obtain a shading map matching the three-dimensional mesh of the target portion according to the three-dimensional mesh of the target portion.

Figure 4:
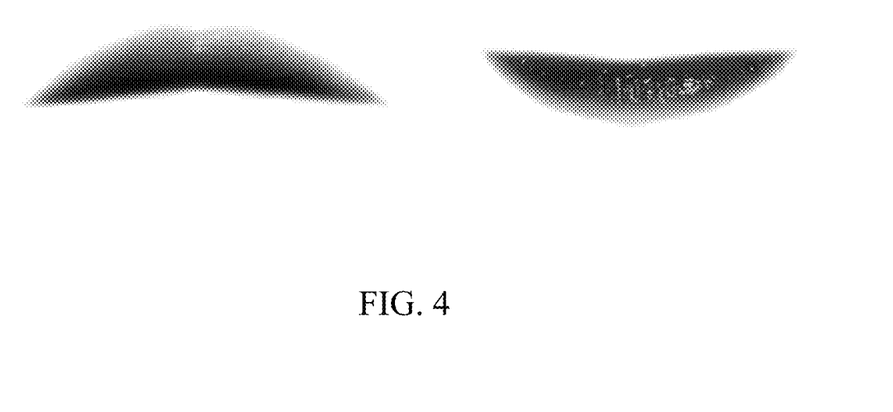
FIG. 4 is a shading map of lips involved in an embodiment of the present application.

As shown in the lip shading map illustrated in FIG. 4, the RGB channels of the lip shading map are (0, 0, 0). The alpha channel reflects the transparency information of the lips, its value is gradually changed to 0 at the edge part, and the value is 1 for the middle main part.

The target RGB value of the target portion is a target RGB value with which the user expects to color the target portion. For example, when the target portion is a lip, the target RGB value is a color value of a lip gloss that the user expects to wear, such as pink, orange and so on.

Next, the target portion is colored based on the position coordinates, the texture coordinates and the normal line of each vertex in the three-dimensional mesh, as well as the preset shading map of the target portion, and the target RGB value of the target portion.

In an example, a vertex is taken as an example, to which reference may be made for other vertices. A gray value corresponding to the position of the vertex v0 is obtained in the preset shading map according to the position coordinates of the vertex v0. Then, the vertex v0 is colored based on the texture coordinates, the normal line, the gray value and the target RGB value corresponding to the vertex v0. With reference to this method, each vertex in the three-dimensional mesh is colored, so that the target portion can be colored.

In another example, other methods may also be used to color the target portion based on the position coordinates, the texture coordinates and the normal line of each vertex in the three-dimensional mesh, as well as the preset shading map of the target portion, and the target RGB value of the target portion.

The augmented reality-based coloring method provided by the embodiments of the present application acquires three-dimensional mesh information of a human face and acquires position coordinates and texture coordinates of respective vertexes of a target portion of the human face based on the three-dimensional mesh information of the human face; constructs a three-dimensional mesh of the target portion according to the position coordinates of respective vertexes of the target portion, and determines a normal line of each vertex in the three-dimensional mesh; and colors the target portion based on the position coordinates, the texture coordinates and the normal line of each vertex in the three-dimensional mesh, a preset shading map of the target portion, and a target RGB value of the target portion, thereby improving the stereoscopic impression and the sense of reality of coloring, and improving the user experience.

Figure 5:
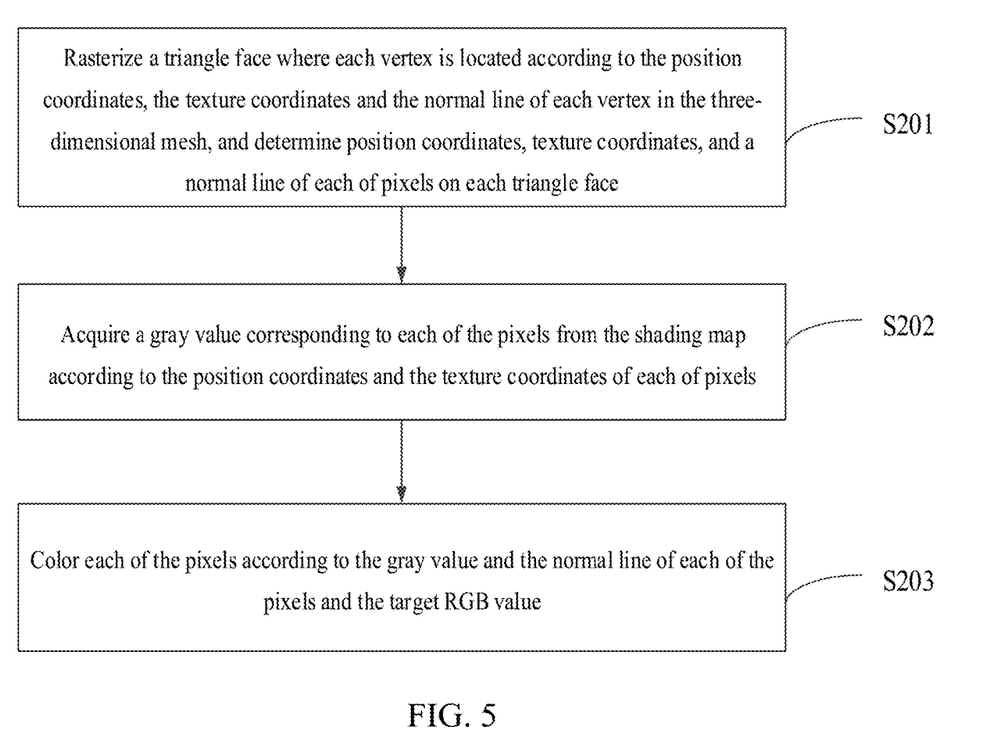
FIG. 5 is a schematic flowchart of an augmented reality-based coloring method provided in a second embodiment of the present application.

FIG. 5 is a schematic flowchart of an augmented reality-based coloring method provided in a second embodiment of the application. On the basis of the above-mentioned embodiments, the present embodiment relates to an implementation process of coloring the target portion based on the position coordinates, the texture coordinates and the normal line of each vertex in the three-dimensional mesh, the preset shading map of the target portion, and the target RGB value of the target portion. As shown in FIG. 5, the foregoing S103 may include:

S201: rasterize a triangle face where each vertex is located according to the position coordinates, the texture coordinates and the normal line of each vertex in the three-dimensional mesh, and determine position coordinates, texture coordinates, and a normal line of each of pixels on each triangle face.

Specifically, the triangular face where each vertex is located is determined according to the position coordinates of each vertex in the three-dimensional mesh, where the triangle face where each vertex is located may be a triangle face where the vertex is located in the three-dimensional mesh, or may be a triangle face formed by the vertex and other adjacent vertices.

Next, the triangle face is rasterized, that is, the triangle face is disassembled into individual pixels. The position coordinates, the texture coordinates, and the normal line of each pixel in the triangle are determined according to the position coordinates, the texture coordinates, and the normal lines of the three vertices that constitute the triangle face, using a preset technical method, such as linearization calculation method.

According to the above method, the position coordinates, the texture coordinates and the normal line of each of the pixels in each triangle face corresponding to each vertex in the three-dimensional mesh can be obtained.

S202: acquire a gray value corresponding to each of the pixels from the shading map according to the position coordinates and the texture coordinates of each of pixels.

Taking a pixel p0 as an example, according to the above steps, the position coordinates and the texture coordinates of the pixel p0 may be obtained. Then, the gray value corresponding to the pixel p0 is obtained from the preset shading map according to the position coordinates and the texture coordinates of p0. For example, when the pixel p0 is a pixel corresponding to a lip, the gray value corresponding to the pixel p0 is obtained from the shading map of the lips shown in FIG. 4 according to the position coordinates and the texture coordinates of the pixel p0.

S203: color each of the pixels according to the gray value and the normal line of each of the pixels and the target RGB value.

In this way, each pixel is colored according to the gray value and the normal line of each pixel obtained in the above steps and the target RGB value, so that the lighting effect of the colored target portion meets a preset adjustment, thereby improving the stereoscopic impression and the sense of reality of the colored target portion.

In a possible implementation manner of this embodiment, the foregoing S203 may include the following steps S2031 to S2033.

S2031: determine a diffuse reflection color value of each of the pixels according to the normal line of each of the pixels, a diffuse reflection intensity, a direction of light and the target RGB value.

The above-mentioned diffuse reflection intensity may be set according to actual needs, that is, the diffuse reflection intensity may be set according to different coloring effects. Optionally, the diffuse reflection intensities corresponding to coloring effects, such as a simple lighting effect, a shadow effect, and an edge blur effect, may be different. The direction of light is a fixed value.

In an example, the embodiment may determine the diffuse reflection color value of each of the pixels according to the following formula (1):

$$I_{diff}=K_d*(N \cdot L)*C, \quad (1)$$

where $I_{diff}$ represents the diffuse reflection color value, $K_d$ represents the diffuse reflection intensity, N represents the normal line of the pixel, L represents the direction of light (fixed value), and C represents the target RGB value.

Formula (1) is only an example, and this embodiment is not limited to it.

S2032: determine a highlight color of each of the pixels according to the normal line and the gray value of each of the pixels, a preset highlight intensity, the direction of light, a line-of-sight direction, and a smoothness coefficient.

Among them, the above-mentioned highlight intensity and the line-of-sight direction may be set according to actual needs, that is, the highlight intensity and the line-of-sight direction may be set according to different coloring effects. Optionally, for coloring effects such as a simple lighting effect, a shadow effect, and an edge blur effect, corresponding highlight intensity and the line-of-sight direction may be different. The direction of light and the smoothness coefficient are fixed values.

In an example, the embodiment may determine the highlight color of each pixel according to the following formula (2):

$$I_{spec}=K_s*((L+V) \cdot N)^S, \quad (2)$$

where $I_{spec}$ represents the highlight color value, $K_s$ represents the highlight intensity, N represents the normal line of the pixel, L represents the direction of light (fixed value), N represents the line-of-sight direction, S represents smoothness coefficient, and T is the gray value corresponding to the pixel in the shading map.

Formula (2) is only an example, and this embodiment is not limited to it.

S2033: determine a color value of each of the pixels output to a display according to the diffuse reflection color value and the highlight color of each of the pixels.

In an example, for each pixel, an average value of the diffuse reflection color value of the pixel and the highlight color of the pixel is taken as the color value of the pixel output to the display.

In another example, for each pixel, a sum of the diffuse reflection color value and the highlight color of the pixel is taken as the color value of the pixel output to the display.

For example, the color value of the pixel output to the display is determined according to the following formula (3):

$$I_{final}=I_{diff}+I_{spec}, \quad (3)$$

The method of the embodiment of the present application determines the diffuse reflection color value of each of the pixels according to the normal line of each of the pixels, the diffuse reflection intensity, the direction of light and the target RGB value; determines the highlight color of each of the pixels according to the normal line and the gray value of each of the pixels, the preset highlight intensity, the direction of light, the line-of-sight direction, and the smoothness coefficient; and determines the color value of each of the pixels output to a display according to the diffuse reflection color value and the highlight color of each of the pixels. Therefore, accurate coloring of each pixel is achieved, so that the colored target portion has stereoscopic impression and the sense of reality. At the same time, makeup try-on under different effects, such as a simple lighting effect, a shadow effect, an edge blur effect, etc., can be realized by changing the above-mentioned parameters, thereby further improving the user experience.

Those of ordinary skill in the art can understand that all or part of the steps in the above method embodiments may be implemented by a program instructing relevant hardware, and the foregoing program may be stored in a computer readable storage medium. When the program is executed, steps including the foregoing method embodiments are performed; and the foregoing storage medium includes: ROM (Read-Only Memory), RAM (Random Access Memory), magnetic disk, or optical disk and other media that can store program codes.

Figure 6:
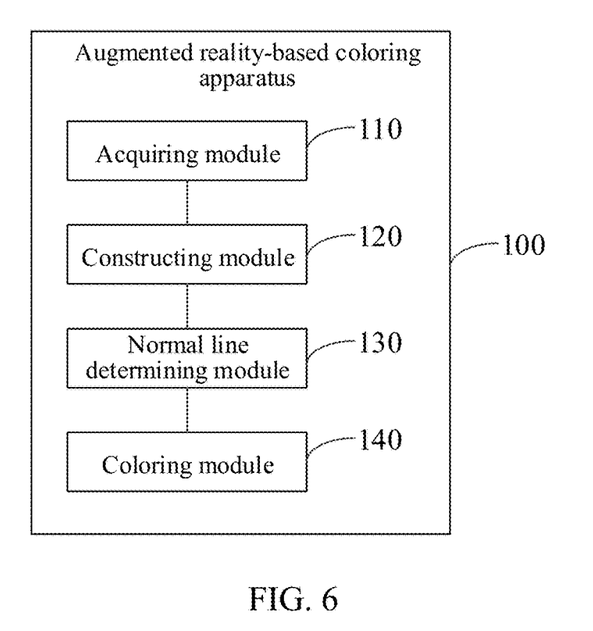
FIG. 6 is a schematic structural diagram of an augmented reality-based coloring apparatus provided in the first embodiment of the present application.

FIG. 6 is a schematic structural diagram of an augmented reality-based coloring apparatus provided in the first embodiment of the application. As shown in FIG. 6, the augmented reality-based coloring apparatus 100 may include:

an obtaining module 110, configured to acquire three-dimensional mesh information of a human face, and acquire position coordinates and texture coordinates of respective vertices of a target portion of the human face based on the three-dimensional mesh information of the human face;

a constructing module 120, configured to construct a three-dimensional mesh of the target portion according to the position coordinates of respective vertices of the target portion;

a normal line determining module 130, configured to determine a normal line of each vertex in the three-dimensional mesh;

a coloring module 140, configured to color the target portion based on the position coordinates, the texture coordinates and the normal line of each vertex in the three-dimensional mesh, a preset shading map of the target portion, and a target RGB value of the target portion.

The augmented reality-based coloring apparatus of the embodiment of the present application may be used to implement the technical solutions of the method embodiments illustrated above, and the implementation principles and technical effects thereof are similar, which will not be repeated here.

Figure 7:
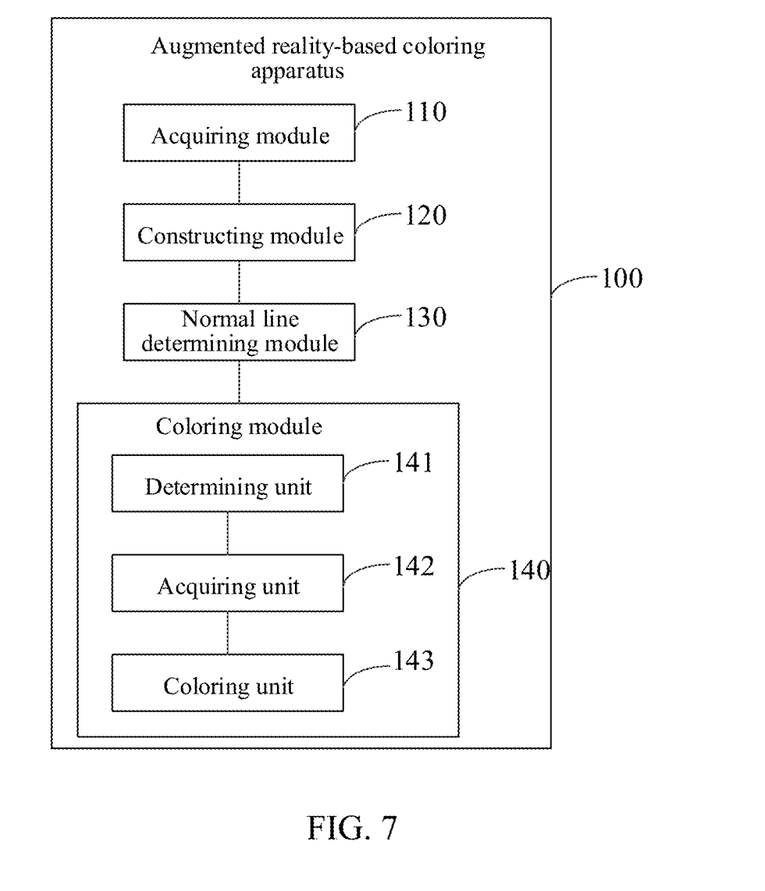
FIG. 7 is a schematic structural diagram of an augmented reality-based coloring apparatus provided in the second embodiment of the present application.

FIG. 7 is a schematic structural diagram of an augmented reality-based coloring apparatus provided in the second embodiment of the application. As shown in FIG. 7, the coloring module 140 includes:

a determining unit 141, configured to, for each vertex, rasterize a triangle face where the vertex is located according to the position coordinates, the texture coordinates and the normal line of the vertex in the three-dimensional mesh, and determine position coordinates, texture coordinates, and a normal line of each of pixels on each triangle face;

an acquiring unit 142 configured to acquire a gray value corresponding to each of the pixels from the shading map according to the position coordinates and the texture coordinates of each of pixels; and a coloring unit 143, configured to color each of the pixels according to the gray value and the normal line of each of the pixels and the target RGB value.

In a possible implementation of this embodiment, the coloring unit 143 is specifically configured to determine a diffuse reflection color value of each of the pixels according to the normal line of each of the pixels, a diffuse reflection intensity, a direction of light and the target RGB value; determine a highlight color of each of the pixels according to the normal line and gray value of each of the pixels, as well as a preset highlight intensity, the direction of light, a line-of-sight direction, and a smoothness coefficient; and determine a color value of each of the pixels output to a display according to the diffuse reflection color value and the highlight color of each of the pixels.

In another possible implementation of this embodiment, the coloring unit 143 is specifically configured to, for each of the pixels, take a sum of the diffuse reflection color value and the highlight color of the pixel as the color value of the pixel output to the display.

In another possible implementation of this embodiment, the normal line determining module 130 is specifically configured to, for each vertex in the three-dimensional mesh, acquire all triangles including the vertex; determine a normal line of the vertex on each of the triangles; and determine the normal line of the vertex according to the normal line of the vertex on each of the triangles.

In another possible implementation of this embodiment, the normal line determining module 130 is specifically configured to add the normal line of the vertex on each of the triangles and perform normalization processing to obtain the normal line of the vertex.

In another possible implementation manner of this embodiment, the normal determination module 130 is specifically configured to cross-multiply vectors of two sides of the triangle where the vertex is located to determine the normal line of the vertex on each of the triangles.

Optionally, the target portion is a lip, and the target RGB value is an RGB value of a target lip gloss.

The augmented reality-based coloring apparatus in the embodiment of the present application can be used to implement the technical solutions of the method embodiments illustrated above, and the implementation principles and technical effects thereof are similar, which will not be repeated here.

Figure 8:
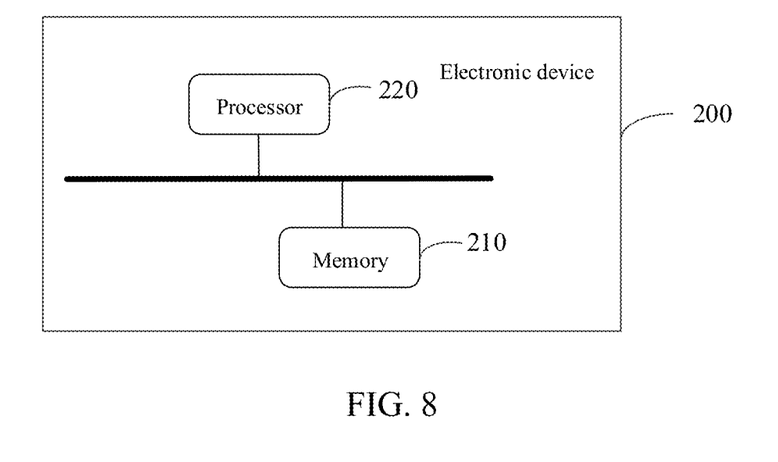
FIG. 8 is a schematic structural diagram of an electronic device provided in an embodiment of the application.

FIG. 8 is a schematic structure diagram of an electronic device provided in an embodiment of the application. As shown in FIG. 8, the electronic device 200 of this embodiment may comprise:

a memory 210, configured to store a computer program; and a processor 220, configured to execute the computer program to implement the augmented reality-based coloring method according to the first aspect.

The electronic device of the embodiment of the present application can be used to implement the technical solutions of the method embodiments illustrated above, and the implementation principles and technical effects thereof are similar, which will not be repeated here.

Figure 9:
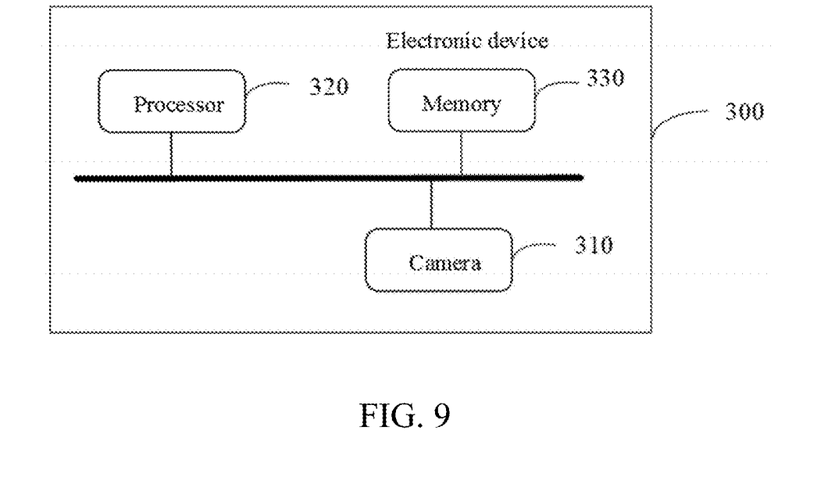
FIG. 9 is a schematic structural diagram of an electronic device provided in an embodiment of the application.

FIG. 9 is a schematic structural diagram of an electronic device provided in an embodiment of the application. As shown in FIG. 9, the electronic device 300 of this embodiment may include:

a camera 310, configured to collect a human face image of a user;

a processor 320, configured to acquire three-dimensional mesh information of a human face according to the human face image, and acquire position coordinates and texture coordinates of respective vertices of a target portion of the human face based on the three-dimensional mesh information of the human face; construct a three-dimensional mesh of the target portion according to the position coordinates of respective vertices of the target portion, and determine a normal line of each vertex in the three-dimensional mesh; and color the target portion based on the position coordinates, the texture coordinates and the normal line of each vertex in the three-dimensional mesh, a preset shading map of the target portion, and a target RGB value of the target portion.

Optionally, the electronic device further includes a memory 330 configured to store a computer program, and the processor 320 is configured to execute the computer program to implement the augmented reality-based coloring method of the foregoing embodiments.

The electronic device of the embodiment of the present application can be used to implement the technical solutions of the method embodiments illustrated above, and the implementation principles and technical effects thereof are similar, which will not be repeated here.

Figure 10:
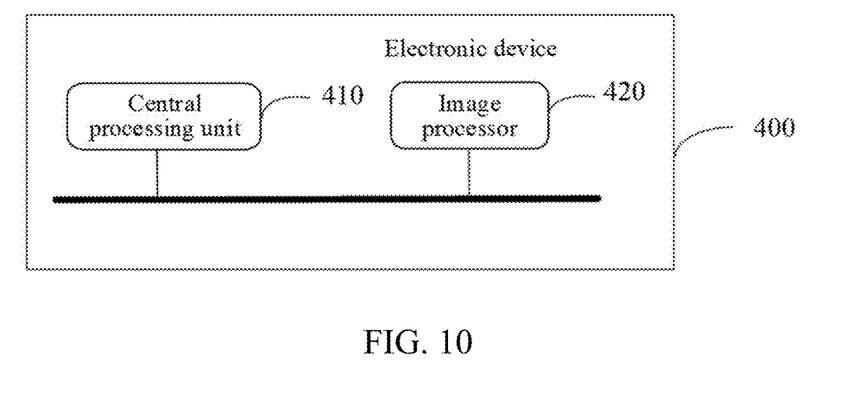
FIG. 10 is a schematic structural diagram of an electronic device provided in an embodiment of the application.

FIG. 10 is a schematic structural diagram of an electronic device provided in an embodiment of the application. The electronic device 400 shown in FIG. 10 may include:

a central processing unit 410, configured to acquire three-dimensional mesh information of a human face, and acquire position coordinates and texture coordinates of respective vertices of a target portion of the human face based on the three-dimensional mesh information of the human face; construct a three-dimensional mesh of the target portion according to the position coordinates of respective vertices of the target portion, and determine a normal line of each vertex in the three-dimensional mesh; and an image processor 420, configured to color the target portion based on the position coordinates, the texture coordinates and the normal line of each vertex in the three-dimensional mesh, a preset shading map of the target portion, and a target RGB value of the target portion.

The electronic device of the embodiment of the present application can be used to implement the technical solutions of the method embodiments illustrated above, and the implementation principles and technical effects thereof are similar, which will not be repeated here.

In a possible implementation of the embodiment of the present application, the image processor 420 is specifically configured to, for each vertex, rasterize a triangle face where the vertex is located according to the position coordinates, the texture coordinates and the normal line of the vertex in the three-dimensional mesh, and determine position coordinates, texture coordinates, and a normal line of each of pixels on each triangle face; acquire a gray value corresponding to each of the pixels from the shading map according to the position coordinates and the texture coordinates of each of the pixels; and color each of the pixels according to the gray value and the normal line of each of the pixel and the target RGB value.

In another possible implementation of the embodiment of the present application, the image processor 420 is specifically configured to determine a diffuse reflection color value of each of the pixels according to the normal line of each of the pixels, a diffuse reflection intensity, a direction of light and the target RGB value; determine a highlight color of each of the pixels according to the normal line and the gray value of each of the pixels, a preset highlight intensity, the direction of light, a line-of-sight direction, and a smoothness coefficient; and determine a color value of each of the pixels output to a display according to the diffuse reflection color value and the highlight color of each of the pixels.

In another possible implementation of the embodiment of the present application, the image processor 420 is specifically configured to, for each of the pixels, take a sum of the diffuse reflection color value and the highlight color of the pixel as the color value of the pixel output to the display.

In another possible implementation manner of the embodiment of the present application, the central processing unit 410 is specifically configured to, for each vertex in the three-dimensional mesh, acquire all triangles including the vertex; determine a normal line of the vertex on each of the triangles; and determine the normal line of the vertex according to the normal line of the vertex on each of the triangles.

In another possible implementation of the embodiment of the present application, the central processing unit 410 is specifically configured to add the normal line of the vertex on each of the triangles and perform normalization processing to obtain the normal line of the vertex.

In another possible implementation manner of the embodiment of the present application, the central processing unit 410 is specifically configured to cross-multiply vectors of two sides of the vertex in the triangle to determine the normal line of the vertex on each triangle.

Optionally, the target portion is a lip, and the target RGB value is an RGB value of the target lip gloss.

The electronic device of the embodiment of the present application can be used to implement the technical solutions of the method embodiments illustrated above, and the implementation principles and technical effects thereof are similar, which will not be repeated here.

The augmented reality-based coloring method, if implemented and sold or used as a standalone product, can be stored in a computer-readable storage medium. Based on such understanding, the technical solution of the present application essentially, or a part contributing to the prior art, may be embodied in a form of a software product, the computer software product is stored in a storage medium and includes a number of instructions for causing a computer device (which may be a personal computer, a server, or a network device, or the like) to perform all or part of the methods according to various embodiments of the present application. The foregoing storage medium includes various medium that can store program codes, such as a U disk, a mobile hard disk, a read-only memory (ROM), a magnetic disk, or an optical disk.

In the foregoing embodiments, it may be implemented in whole or in part by software, hardware, firmware, or any combination thereof. When implemented by software, it can be implemented in the form of a computer program product in whole or in part. The computer program product includes one or more computer instructions. When the computer program instructions are loaded and executed on the computer, all or part of the processes or functions described in the embodiments of the present application are generated. The computer may be a general-purpose computer, a special-purpose computer, a computer network, or other programmable apparatus. The computer instructions may be stored in a computer-readable storage medium, or transmitted from a computer-readable storage medium to another computer-readable storage medium. For example, the computer instructions may be transmitted from a website site, computer, server, or data center to another website site, computer, server or data center in a wired (such as coaxial cable, optical fiber, digital subscriber line (DSL)) or wireless (such as infrared, wireless, microwave, etc.) manner. The computer-readable storage medium may be any available medium that can be accessed by a computer or a data storage device, such as a server or data center, integrated with one or more available media. The available medium may be a magnetic medium (such as, a floppy disk, a hard disk, a magnetic tape), an optical medium (such as, a DVD), or a semiconductor medium (such as, a solid state disk (SSD)).

Finally, it should be noted that the above embodiments are only used to illustrate the technical solutions of the application, but not to limit it; although the application has been described in detail with reference to the foregoing embodiments, those of ordinary skill in the art should understood that it is still possible to modify the technical solutions described in the foregoing embodiments, or equivalently replace some or all of the technical features thereof; and these modifications or replacements do not cause the essence of the corresponding technical solutions to deviate from the scope of the technical solutions of the embodiments of the present application.

What is claimed is:

1. An augmented reality-based coloring method, comprising:
    acquiring three-dimensional mesh information of a human face, and acquiring position coordinates and texture coordinates of respective vertices of a target portion of the human face based on the three-dimensional mesh information of the human face;
    constructing a three-dimensional mesh of the target portion according to the position coordinates of respective vertices of the target portion, and determining a normal line of each vertex in the three-dimensional mesh; and
    coloring the target portion based on the position coordinates, the texture coordinates and the normal line of each vertex in the three-dimensional mesh, a preset shading map of the target portion, and a target RGB value of the target portion.

2. The method according to claim 1, wherein the coloring the target portion based on the position coordinates, the texture coordinates and the normal line of each vertex in the three-dimensional mesh, a preset shading map of the target portion, and a target red-green-blue (RGB) value of the target portion, comprises:
    rasterizing a triangle face where each vertex is located according to the position coordinates, the texture coordinates and the normal line of each vertex in the three-dimensional mesh, and determining position coordinates, texture coordinates, and a normal line of each of pixels on each triangle face;
    acquiring a gray value corresponding to each of the pixels from the shading map according to the position coordinates and the texture coordinates of each of pixels; and
    coloring each of the pixels according to the gray value and the normal line of each of the pixels and the target RGB value.

3. The method according to claim 2, wherein the coloring each of the pixels according to the gray value and the normal line of each of the pixels and the target RGB value, comprises:

determining a diffuse reflection color value of each of the pixels according to the normal line of each of the pixels, a diffuse reflection intensity, a direction of light and the target RGB value;

determining a highlight color of each of the pixels according to the normal line and the gray value of each of the pixels, a preset highlight intensity, the direction of light, a line-of-sight direction, and a smoothness coefficient; and determining a color value of each of the pixels output to a display according to the diffuse reflection color value and the highlight color of each of the pixels.

4. The method according to claim 3, wherein the determining a color value of each of the pixels output to a display according to the diffuse reflection color value and the highlight color of each of the pixels, comprises:

for each of the pixels, taking a sum of the diffuse reflection color value and the highlight color of the pixel as a color value of the pixel output to the display.

5. The method according to claim 1, wherein the determining a normal line of each vertex in the three-dimensional mesh, comprises:

for each vertex in the three-dimensional mesh, acquiring all triangles including the vertex;

determining a normal line of the vertex on each of the triangles; and determining the normal line of the vertex according to the normal line of the vertex on each of the triangles.

6. The method according to claim 5, wherein the determining a normal line of the vertex according to the normal line of the vertex on each of the triangles, comprises:

adding the normal line of the vertex on each of the triangles and performing normalization processing to obtain the normal line of the vertex.

7. The method according to claim 5, wherein the determining a normal line of the vertex on each of the triangles, comprises:

cross-multiplying vectors of two sides of the triangle where the vertex is located to determine the normal line of the vertex on each of the triangles.

8. The method according to claim 1, wherein the target portion is a lip, and the target RGB value is an RGB value of a target lip gloss.

9. An augmented reality-based coloring apparatus, comprising:

at least one processor; and a memory communicatively connected to the at least one processor; wherein, the memory stores instructions executable by the at least one processor, and when the instructions are executed by the at least one processor, the method according to claim 1 is implemented.

10. The apparatus according to claim 9, wherein the at least one processor is further configured to:

rasterize a triangle face where each vertex is located according to the position coordinates, the texture coordinates and the normal line of each vertex in the three-dimensional mesh, and determine position coordinates, texture coordinates, and a normal line of each of pixels on each triangle face;

acquire a gray value corresponding to each of the pixels from the shading map according to the position coordinates and texture coordinates of each of the pixels; and color each of the pixels according to the gray value and the normal line of each of the pixels and the target red-green-blue (RGB) value.

11. The apparatus according to claim 10, wherein:

the at least one processor is specifically configured to determine a diffuse reflection color value of each of the pixels according to the normal line of each of the pixels, a diffuse reflection intensity, a direction of light and the target RGB value; determine a highlight color of each of the pixels according to the normal line and the gray value of each of the pixels, a preset highlight intensity, the direction of light, a line-of-sight direction, and a smoothness coefficient; and determine a color value of each of the pixels output to a display according to the diffuse reflection color value and the highlight color of each of the pixels.

12. The apparatus according to claim 11, wherein:

the at least one processer is specifically configured to, for each of the pixels, take a sum of the diffuse reflection color value and the highlight color of the pixel as a color value of the pixel output to the display.

13. The apparatus according to claim 9, wherein:

the at least one processor is specifically configured to, for each vertex in the three-dimensional mesh, acquire all triangles including the vertex; determine a normal line of the vertex on each of the triangles; and determine the normal line of the vertex according to the normal line of the vertex on each of the triangles.

14. The apparatus according to claim 13, wherein:

the at least one processor is specifically configured to add the normal line of the vertex on each of the triangles and perform normalization processing to obtain the normal line of the vertex.

15. The apparatus according to claim 14, wherein:

the at least one processor is specifically configured to cross-multiply vectors of two sides of the triangle where the vertex is located to determine the normal line of the vertex on each of the triangles.

16. The apparatus according to claim 9, wherein the target portion is a lip, and the target RGB value is an RGB value of a target lip gloss.

17. An electronic device, comprising:

a camera, configured to collect a human face image of a user;

a processor, configured to acquire three-dimensional mesh information of a human face according to the human face image, and acquire position coordinates and texture coordinates of respective vertices of a target portion of the human face based on the three-dimensional mesh information of the human face; construct a three-dimensional mesh of the target portion according to the position coordinates of respective vertices of the target portion, and determine a normal line of each vertex in the three-dimensional mesh; and color the target portion based on the position coordinates, the texture coordinates and the normal line of each vertex in the three-dimensional mesh, a preset shading map of the target portion, and a target red-green-blue (RGB) value of the target portion.

18. An electronic device, comprising:

a central processing unit, configured to acquire three-dimensional mesh information of a human face, and acquire position coordinates and texture coordinates of respective vertices of a target portion of the human face based on the three-dimensional mesh information of the human face; construct a three-dimensional mesh of the target portion according to the position coordinates of respective vertex of the target portion, and determine a normal line of each vertex in the three-dimensional mesh; and an image processor, configured to color the target portion based on the position coordinates, the texture coordinates and the normal line of each vertex in the three-dimensional mesh, a preset shading map of the target portion, and a target red-green-blue (RGB) value of the target portion.

19. The electronic device according to claim 18, wherein, the image processor is specifically configured to rasterize a triangle face where each vertex is located according to the position coordinates, the texture coordinates and the normal line of each vertex in the three-dimensional mesh, and determine position coordinates, texture coordinates, and a normal line of each of pixels on each triangle face; acquire a gray value corresponding to each pixel from the shading map according to the position coordinates and texture coordinates of each of pixels; and color each of the pixels according to the gray value and normal line of each pixel as well as the target RGB value.

20. A non-transitory computer readable storage medium, having a computer program stored thereon, wherein the computer program is configured to implement the augmented reality-based coloring method according to claim 1.

* * * * *